(12) United States Patent
Yu et al.

(10) Patent No.: US 12,368,504 B2
(45) Date of Patent: Jul. 22, 2025

(54) CPRI SATELLITE COMMUNICATION SYSTEM AND METHOD

(71) Applicant: AST & Science, LLC, Miami, FL (US)

(72) Inventors: Zhi Zhong Yu, Reading (GB); Federico Pedro Fawzi, Midland, TX (US)

(*) Notice: Subject to any disclaimer, the term of this patent is extended or adjusted under 35 U.S.C. 154(b) by 264 days.

(21) Appl. No.: 18/196,556

(22) Filed: May 12, 2023

(65) Prior Publication Data

US 2023/0379048 A1 Nov. 23, 2023

Related U.S. Application Data

(60) Provisional application No. 63/343,016, filed on May 17, 2022.

(51) Int. Cl.
H04B 7/185 (2006.01)

(52) U.S. Cl.
CPC ........ H04B 7/18532 (2013.01); H04B 7/1851 (2013.01)

(58) Field of Classification Search
CPC .............. H04B 7/18532; H04B 7/1851; H04B 7/18541; H04B 7/2041
See application file for complete search history.

(56) References Cited

U.S. PATENT DOCUMENTS

| | | | | |
|---|---|---|---|---|
| 11,804,893 B2* | 10/2023 | Yao | ........................ | H04W 76/10 |
| 11,956,810 B2* | 4/2024 | Hata | .................... | H04W 72/535 |
| 2008/0051080 A1* | 2/2008 | Walker | ................. | H04B 7/2041 |
| | | | | 455/427 |
| 2010/0198455 A1* | 8/2010 | Hotta | ....................... | G08G 1/20 |
| | | | | 701/31.4 |
| 2016/0117853 A1* | 4/2016 | Zhong | .................... | B64U 30/20 |
| | | | | 345/634 |
| 2016/0134353 A1* | 5/2016 | Lange | .................. | H04J 3/0682 |
| | | | | 370/345 |
| 2019/0058522 A1* | 2/2019 | Haley | ...................... | G06F 16/23 |
| 2019/0313397 A1* | 10/2019 | Chen | .................... | H04B 7/0626 |
| 2020/0100291 A1* | 3/2020 | Ravishankar | ......... | H04W 72/04 |
| 2020/0367097 A1* | 11/2020 | Tarimala | ............... | H04L 1/1887 |
| 2022/0061004 A1* | 2/2022 | Wigard | ............ | H04W 36/0088 |
| 2022/0368415 A1* | 11/2022 | Panthi | ................ | H04B 7/18578 |
| 2023/0189008 A1* | 6/2023 | Martch | .................. | H04B 7/185 |
| | | | | 370/320 |

* cited by examiner

*Primary Examiner* — Dominic E Rego

(57) ABSTRACT

The technology relates to a Common Public Radio Interface (CPRI) satellite communication system and corresponding method. The satellite communication system has, in one arrangement, a base station configured to communicate with standard compliant user equipment (UE) via a satellite having a field of view. The base station includes a plurality of base band units and a base station memory configured to store control information, downlink signal information and uplink signal information associated with a cell in the field of view. The system also includes a processing device configured to cause the satellite to generate a satellite beam in accordance with the control information, downlink signal information and uplink signal information stored in the base station memory.

10 Claims, 5 Drawing Sheets

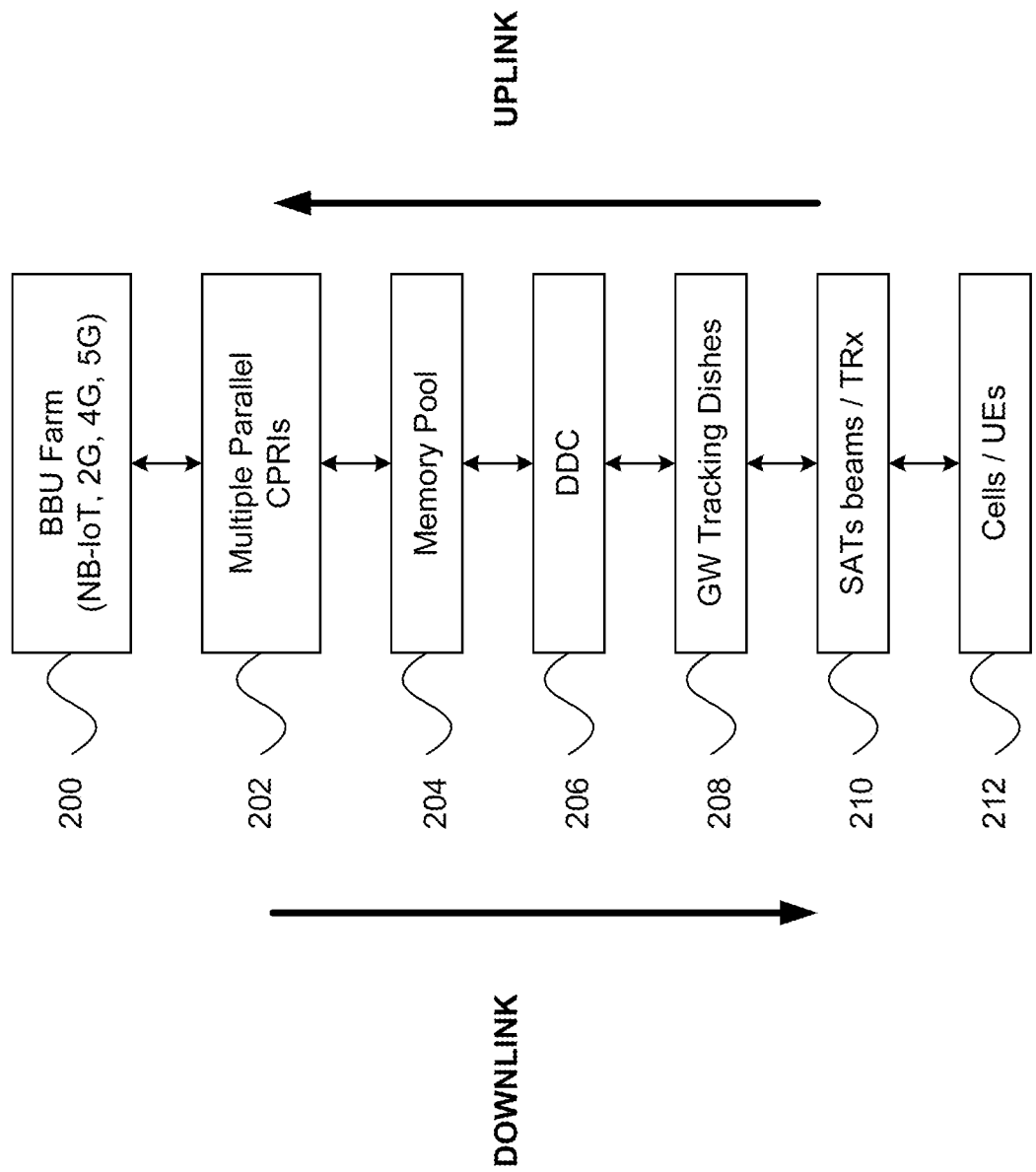

CPRI SATELLITE COMMUNICATION SYSTEM AND METHOD

CROSS-REFERENCE TO RELATED APPLICATIONS

This application claims the benefit of and priority to U.S. Provisional Application No. 63/343,016, filed May 17, 2022, the entire disclosure of which is incorporated herein by reference.

BACKGROUND

The Common Public Radio Interface (CPRI) standard defines an interface between Radio Equipment Control (REC) and Radio Equipment (RE), and can be used to communicate data between cellular sites (e.g., cell towers) and base stations. The base stations include, for example, base transceiver stations (BTS), which provide wireless communication between user equipment (UE) (e.g., mobile phones), having an eNodeB processing device.

A low-Earth orbit (LEO) satellite constellation provides global coverage including coverage to ordinary mobile phones (UEs in 4G) that are outside the coverage area of terrestrial cell towers (including oceans). U.S. Pat. No. 9,973,266 and U.S. Publication No. 2019/0238216 show a system for assembling a large number of small satellite antenna assemblies in space to form a large array, the entire content which are incorporated herein by reference.

BRIEF SUMMARY

According to one aspect of the technology, a satellite communication system comprises a base station and a processing device. The base station is configured to communicate with standard compliant user equipment (UE) via a satellite having a field of view. The base station comprises a plurality of base band units and a base station memory configured to store control information, downlink signal information and uplink signal information associated with a cell in the field of view. The processing device is configured to cause the satellite to generate a satellite beam in accordance with the control information, downlink signal information and uplink signal information stored in the base station memory.

In an example, the UE comprises a wireless device. For instance, the UE may be a cellular phone. The satellite may be arranged to communicate directly with the UE.

In one example, the base station memory includes a control information buffer to store the control information, a downlink signal buffer to store the downlink signal information, and an uplink signal buffer to store the uplink signal information. The downlink signal information and the uplink signal information may each include in-phase and quadrature component information for respective downlink or uplink communication channels. Alternatively or additionally, the control information may include one or more of cell identifiers, a communication type, a packing order, a phase array format, beam handover (BHO) cell identifiers, or BHO rescheduling information.

According to another aspect of the technology, a satellite communication method comprises: generating, by a gateway controller module, control information and uplink signal information associated with a cell in a field of view of a satellite configured to communicate with standard compliant user equipment (UE); storing, by a common public radio interface (CPRI), the control information in a control information buffer; storing, by the CPRI, the uplink signal information in an uplink signal buffer; associating, by one or more processors, the control information and uplink signal information with one or more baseband units of a baseband unit array, wherein the control information is used by the gateway controller module to control each of the one or more baseband units; obtaining, by the CPRI, downlink signal information from the one or more baseband units; storing, by the CPRI, the downlink signal information in a downlink signal buffer; and causing the satellite to generate a satellite beam in accordance with the stored control information, downlink signal information and uplink signal information.

The downlink signal information and the uplink signal information may each include in-phase and quadrature component information for respective downlink or uplink communication channels. Alternatively or additionally, the control information may include one or more of cell identifiers, a communication type, a packing order, a phase array format, beam handover (BHO) cell identifiers, or BHO rescheduling information.

BRIEF DESCRIPTION OF THE DRAWINGS

FIG. 4 illustrates a method of operation in accordance with aspects of the technology.

DETAILED DESCRIPTION OF THE INVENTION

Figure 1A:
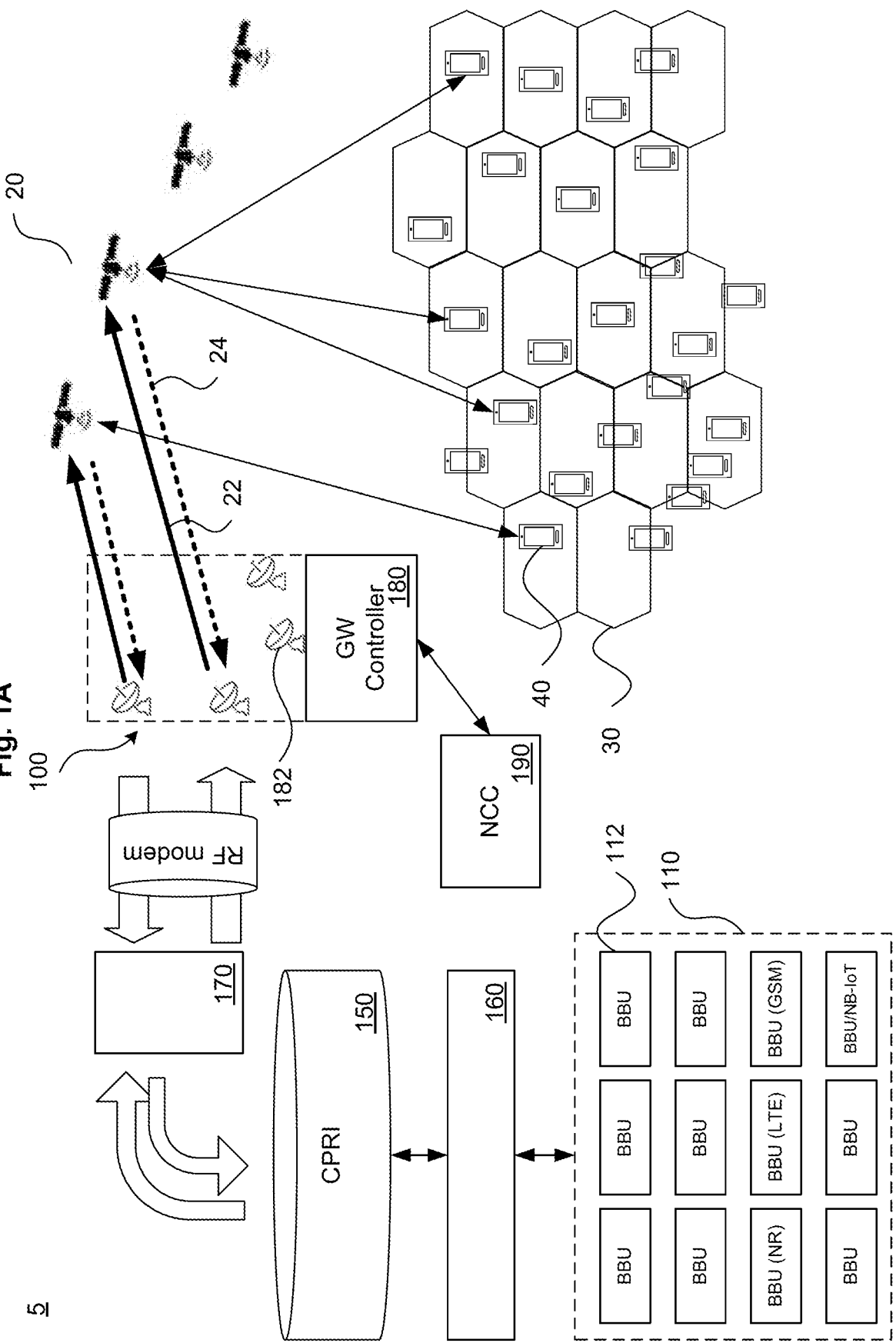
FIGS. 1A-B illustrate a satellite communication system in accordance with aspects of the technology.

In describing the illustrative, non-limiting embodiments of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose. Several embodiments of the invention are described for illustrative purposes, it being understood that the invention may be embodied in other forms not specifically shown in the drawings.

Referring to the drawings, FIG. 1A illustrates one embodiment of a mobile communication system, including a 1G4S (1 gateway 100 with 4 satellites 20) satellite system, though other configurations can also be provided. In particular, FIG. 1 shows a satellite communication system 5 having one or more satellites 20 and a gateway site (GWS) or ground station (GW) 100 in accordance with one embodiment of the present disclosure. The gateway site 100 includes a gateway channel routing block 110, CPRI interface 150, buffer memory pool 170, gateway controller 180, gateway antennas 182, and an NCC 190. As shown, the gateway 100 communicates with user equipment (UEs) on Earth via the one or more satellites 20. The gateway antennas 182 are directional antennas tracking the satellites.

The gateway channel routing block 110 provides the appropriate channel signals for corresponding to the gateway antennas 182 and a plurality of eNodeBs, such as Base Band Units (BBUs) 112, for every geographical cell. The gateway site 100 is in communication with UEs via the satellite(s) 20, such as a setting satellite and a rising satellite. The satellites 20 communicate with the UEs over respective setting TRx beams and rising TRx beams. The gateway controller 180 communicates with the satellite(s) 20 over a V-band uplink (UL) signal 22 and an RF analog downlink (DL) signal 24. The gateway site 100 includes gateway antennas 182, with respect to their serving eNodeBs, such as BBUs 112 for cells 30. The feeder link beams may, for example, have a wide bandwidth with frequency of 40-50 GHz. And the service link beams are controlled by a Network Mobile Operator (NMO).

FIG. 1 further shows the satellites 20 RAN (radio access network, e.g., GSM, LTE and 5G NR) signal footprints or field of views (FoV) on the Earth's surface. The ground cells 30 are served by the satellites 20, which are linked to the gateway channel routing block 110, via gateway antennas 182 that interface with the respective processing devices (i.e., eNodeBs) at the BBUs 112 serving those ground cells 30. The BBUs 112 control communication with the UEs via the satellites 20.

Each satellite 20 has a field of view (FoV), and has a plurality of service beams and a plurality of cells 30 in the field of view (FoV). A service beam is between a cell 30 and the satellite 20, and thus, corresponds to the cell 30. The service beam can have an uplink beam and downlink beam. Signals transmitted via service beams can include uplink signals from a wireless device 40 (such as mobile user equipment) in a cell to the satellite 20, and downlink signals from the satellite 20 to a wireless device 40 in a cell.

In some examples, the ground station 100 has a routing block 110 with many base station BBUs, e.g., an eNB farm. The processing device at the BBUU 112 can be, for example, a server or computer such as RAN base station forms, such as BTS for GSM, eNodeB for LTE and gNodeB for 5G, which transmit (Tx) and receive (Rx) LTE signals and can communicate with a GWS device that is located at the ground station.

The ground station processing device (e.g., the eNodeB) at the BBU 112, can be configured to control operation of the satellite communication system 5, including communication between the satellite 20 and the UEs 40, and communication between the satellite 20 and the ground station. In particular, the eNodeB 112 can dynamically configure the RAN for the satellite 20 to provide on-demand resource allocation, for example, bandwidth and/or power allocation.

In one example embodiment of the disclosure, the satellite communication system 5 includes a Network Control Center (NCC) 190. The NCC 190 can be provided, for example, at the ground station 100, and can include a database. The NCC 190 supervises the digital data communications (DDC) of each beam and orders base handover and specifies durations. According to one scenario, the NCC 190 is configured to control the eNodeBs to start with two ports, tells the gateway ready for which SMs, and gateway acknowledgement ready. The NCC has cell mapping knowledge, collects ENodeB/RAN base station information, decides cells serving SM orchestrates the beam handover (BHO) between eNodeBs and gateways, piggy-backs via control channel, and tracks the load balance on SM and gateway. The NCC 190, follows the priority checklist from Q/V bandwidth to battery power, including the inactive and active beam control.

The NCC 190 database is accessed by the BBU and stores available resource data for all resources, including for example power and bandwidth. For example, the resource data can indicate how much data is being used for all cells. The BBU (e.g., eNodeB 112) is in communication with the NCC 190 database and can access the NCC 190 database to provide resource allocation based on demand statistics stored at the NCC 190 database. The eNodeB can periodically access the NCC database, or the NCC can periodically send a demand statistics report to the eNodeB 112 via, for example, a control channel. The eNodeB 112 can then determine, for example, the appropriate operating parameters for communications between the satellite 20 and the UE 40, as well as communications between the ground station and the satellite 20, including for example RAN, bandwidth, power, MIMO, number of BBU.

Figure 2:
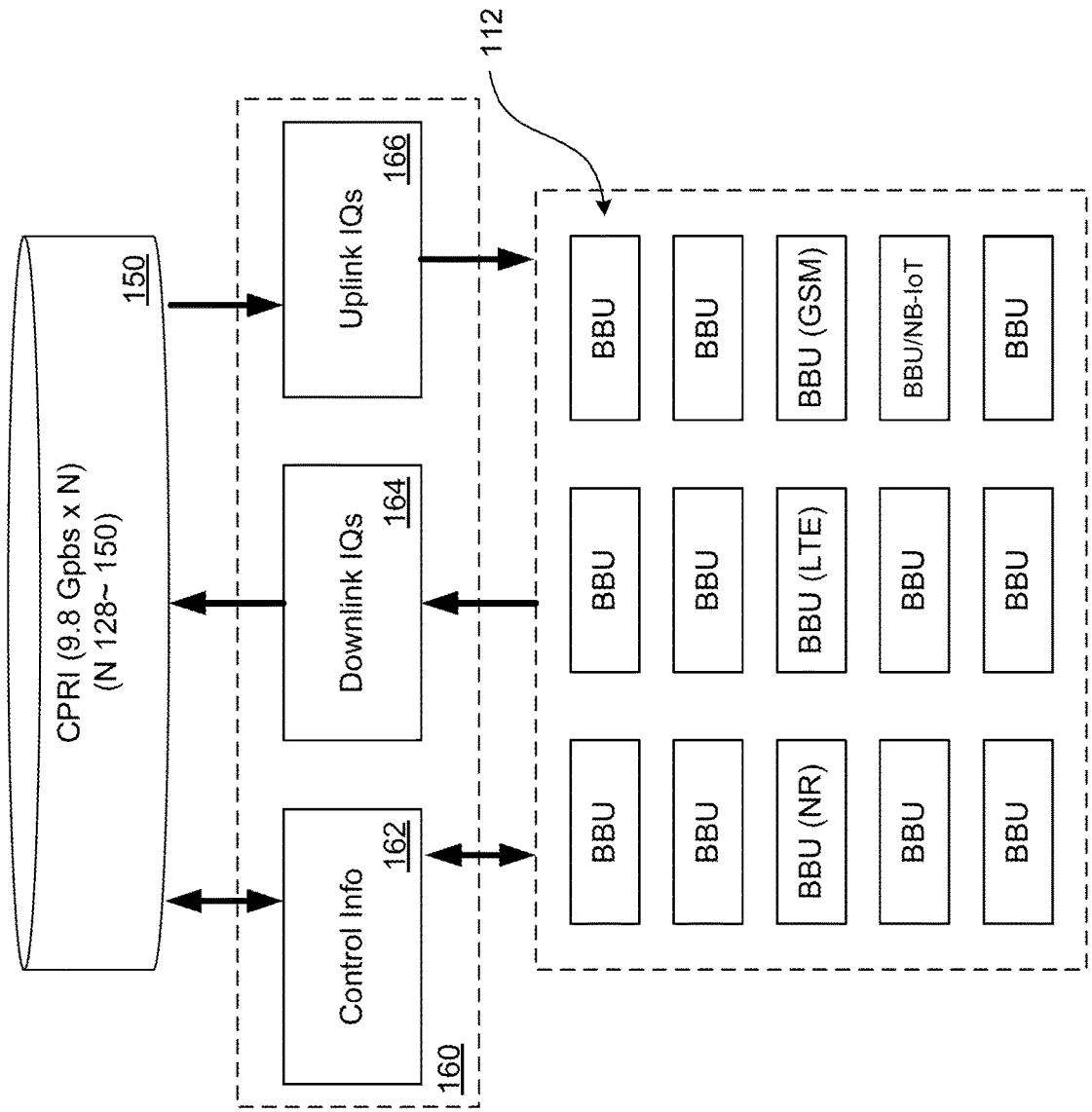
FIG. 2 illustrates modules of the satellite communication system of FIG. 1 in accordance with aspects of the technology.

Turning to FIG. 2, in an embodiment of the present disclosure, the gateway station 100 has a CPRI interface device 150, and a plurality of BBUs 112 to form an array. Each BBU includes a processing device, for example an eNodeB. In one embodiment, 500 cells 30 for one satellite 20 and one gateway station 100 would serve four satellites 20, totaling 2048 10 MHz cells. A cell's eNodeB 112 with two RF ports can deliver the downlink and uplink signals through two gateway (GW) antennas 182 that serve two satellites 20, each baseband unit (BBU) of a cell providing a beam signal for HO service link via feeder link for two TRx paths to the two RF ports on the eNodeB BBU 112.

The CPRI interface 150 includes buffer/memory 160, which includes a control information buffer 162, downlink signal buffer 164, and uplink signal buffer 166. As shown, the buffer 160 can be a lookup table or the like that stores control and monitor data, downlink signal data and uplink signal data in association with each individual cell 30 of the plurality of cells 30. In the embodiment shown, the leftmost column indicates the cell (e.g., Cell 0 . . . Cell x). The next column indicates the mobile network (e.g., 5G, 4G, etc.) for that cell. The next column is the header/control channel buffer 162 and stores control and monitor data for that cell. The next column is the downlink signal buffer 164 and stores downlink signal information, for example downlink signal component data (e.g., the signal In-phase (I) and Quadrature (Q) component information) for the downlink channels. The final column is the uplink signal buffer 166 and stores uplink signal information, for example uplink signal component data (e.g., the signal In-phase (I) and Quadrature (Q) component information) for the uplink channels.

Thus, the signal component data represent the signal, for example the signal components I and Q represent a signal x over a period of time t, whereby $x(t)=I(t)+jQ(t)$. Accordingly, the IQs for the downlink signals are stored in the downlink database 164, and represent the In-phase and Quadrature components for the downlink signal over which the satellites 20 communicate with the UEs 40. And, the IQs for the uplink signals are stored in the uplink database 166, and represent the In-phase and Quadrature components for the uplink signal over which the UEs 40 communicate with the satellites 20. It is noted that while IQs are stored in the buffer 160, any suitable signal components can be utilized within the spirit and scope of the present disclosure.

The control information buffer 162 is in communication with each one of the BBUs 112 of the BBU array. The control buffer 162 stores control and monitor information, for example received from or generated by the gateway controller 180. As shown, control information can include, for example, cell IDs (latitude, longitude, height), packing order, phase array format, BHO cell IDs, and BHO scheduling. The CPRI interface device 150 receives that control and monitor information from the gateway controller 180, stores that information in the control information buffer 162, and communicates that data to each of the plurality of BBUs 112. For example, the BBU eNodeB can access the control data from the control information buffer 162. Or, the control data can be transmitted from the buffer 162 to the BBU 112 eNodeB. The gateway controller 180 uses the control data to control operation of the BBUs 112, e.g., the eNodeBs.

The downlink information buffer 164 is in communication with each one of the BBUs 112 of the BBU array. The downlink buffer 164 stores downlink information, for example received from or generated by the BBUs 112. As shown, the downlink information can include, for example, downlink IQs. The CPRI interface device 150 receives that downlink information from the BBUs 112, stores that information in the downlink information buffer 164, and communicates that data to the gateway controllers 180. For example, the gateway controller 180 can access the downlink data from the downlink information buffer 164. Or, the downlink data can be transmitted from the buffer 164 to the gateway controller 180.

Figure 1B:
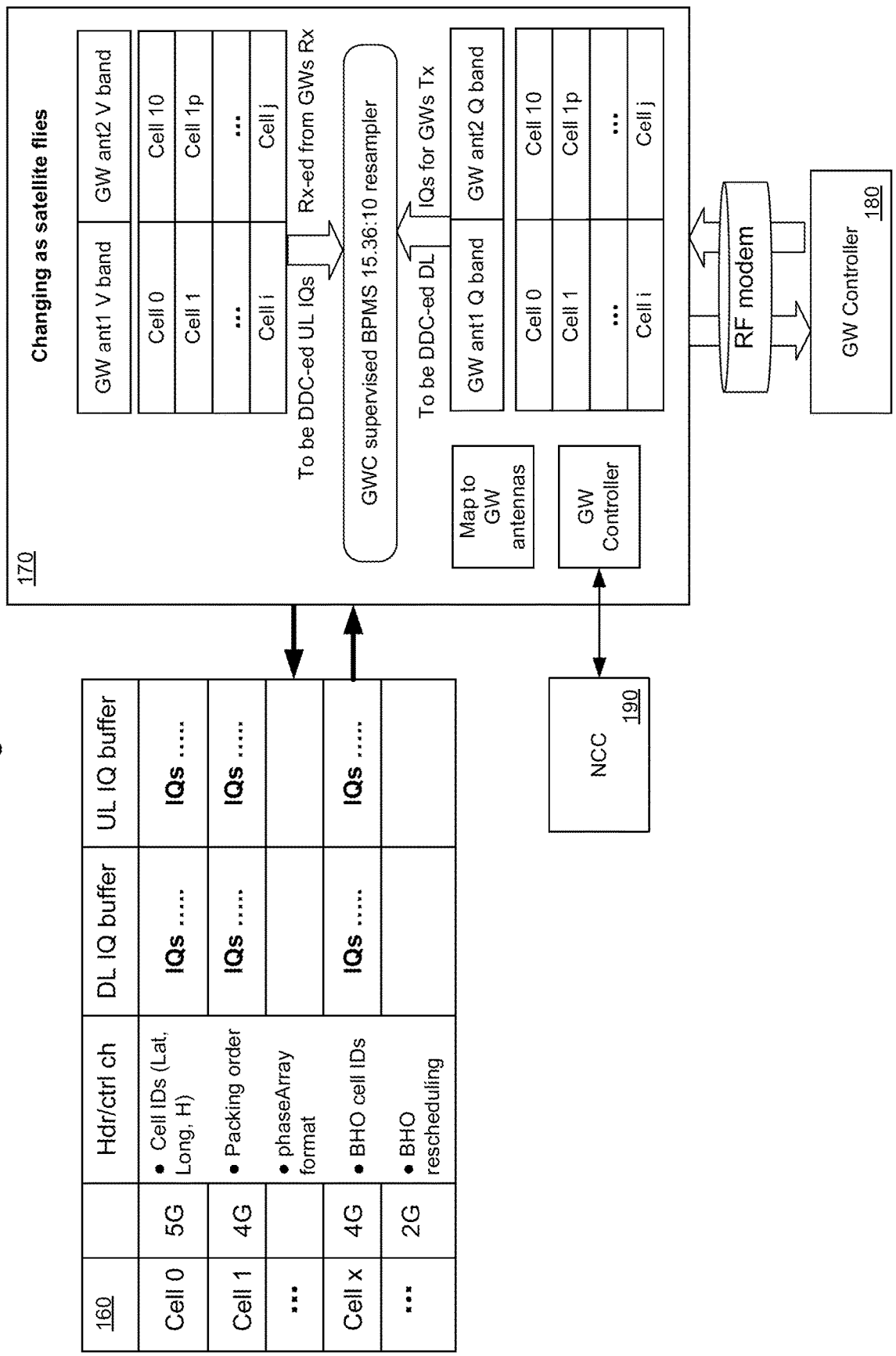

FIG. 1B illustrates aspects of FIG. 1A, in particular buffer/memory 160 and buffer memory pool 170 (which couples to the GW controller 180 via an RF modem). As shown in this example, memory 160 maintains information for a set of cells (Cell 0, Cell 1, . . . , Cell x), including the communication type (e.g., 5G, 4G, 2G, etc.), Hdr/control channel information (e.g., cell IDs, packing order, phase array format, BHO cell IDs, BHO rescheduling, etc.), downlink IQ buffer information and/or uplink IQ buffer information. GW antenna routing information is supplied to memory pool 170, and GW antenna information is received from the memory pool 170. The information in the memory pool may change as the satellites fly. Note that the cell index reveals where the cell centers are located.

This figure also illustrates that the NCC 190 is operatively coupled with the GW controller 180. The NCC supervises the DDC of each beam. It is also configured to order BHO and specify the durations (e.g., eNBs start with 2 ports; NCC tells the GW ready for which satellites; GW acknowledges it is ready). The NC has the cell mapping knowledge, collects eNB/RAN base station information, decides cells serving SM orchestrates the BHOs between eNB farm and GWs, piggy-back via a control channel, tracks the load balance on the satellites and GW, and follows the priority checklist from Q/V bandwidth to battery power, including the active/inactive beams control. Each eNB (base station) may be 1:1 mapped to a given cell. The NCC may help the system to fine a UE's location. It may also provide feedback to an eNB for the e/ICIC.

Thus, with reference to FIGS. 2, 4, in one example embodiment, one or more of the BBU 112 eNodeBs can cause the satellite 20 to generate a downlink signal to transmit information to UEs in a selected cell 30, step 200. The BBU(s) 112 may be part of a BBU farm, which may support, e.g., NB-IoT, 2G, 4G and/or 5G. The BBU(s) communicate with multiple parallel CPRIs, as shown at block 202. Via this, the BBU eNodeB retrieves the downlink signal component data (e.g., the downlink IQ data) for the selected cell 30 from the downlink buffer 164 memory pool, step 204 and transmits (e.g., via digital data communication, step 206) the desired information and retrieved downlink signal component data to the gateway controller 180, step 208. The gateway controller 180, in turn, transmits that information to the satellite 20 over a gateway uplink signal 24, step 210. The satellite 20 then generates a downlink signal to the UE in accordance with the selected cell and associated downlink signal component data received from the GW controller 180, step 212.

The uplink process operates in reverse of the downlink process. The uplink information buffer 166 is in communication with each one of the BBUs 112 of the BBU array. The uplink buffer 166 stores uplink signal information, for example received from or generated by the gateway controllers 180. As shown, the uplink signal information can include, for example, IQs. The CPRI interface device 150 receives that uplink information from the gateway controllers 180, stores that information in the uplink information buffer 166, and communicates that data to the BBUs 112. For example, the BBU 112 eNodeBs can access the uplink data from the uplink information buffer 166. Or, the uplink data can be transmitted from the buffer 166 to the BBU 112 eNodeBs.

Accordingly, the single memory device 160 consolidates all the control information, uplink information and downlink information. That information can be communicated between the gateway controllers 180 and the plurality of BBUs 112.

Figure 3:
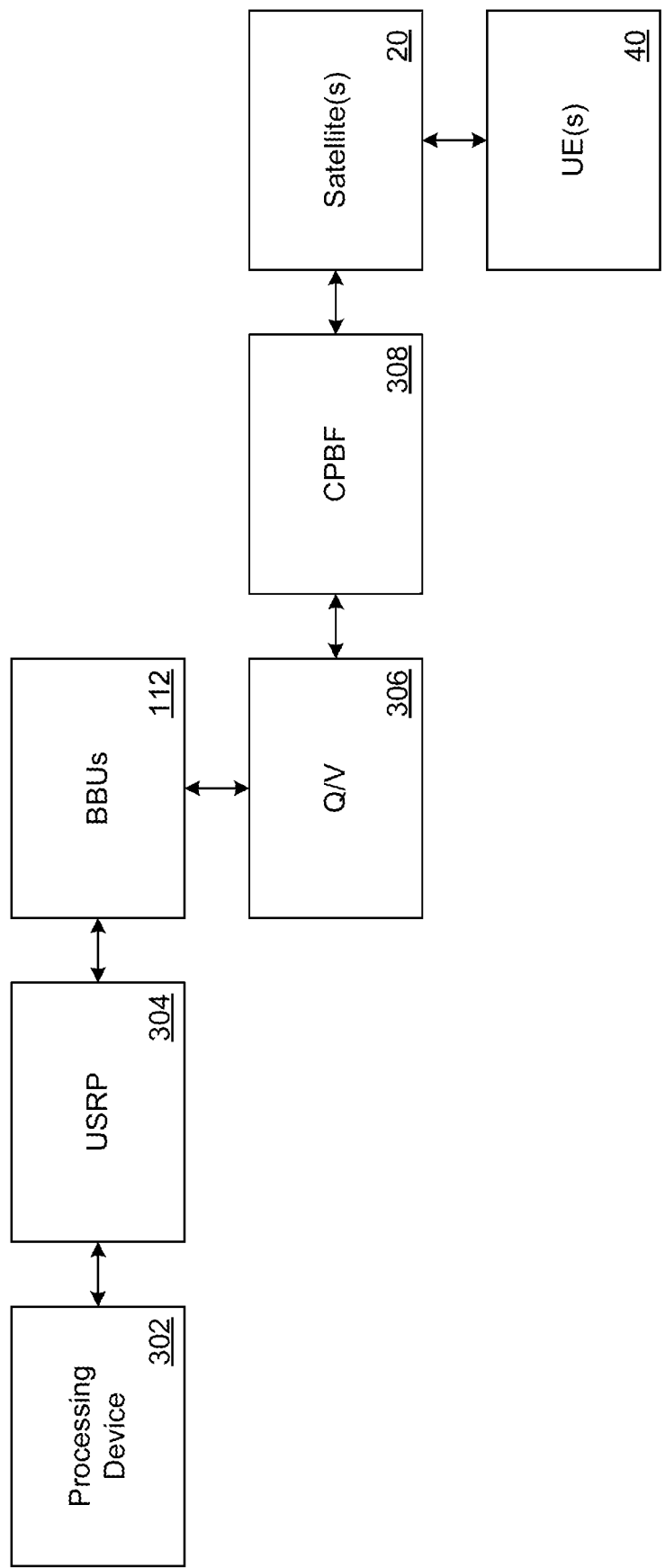
FIG. 3 illustrates an arrangement 300 providing satellite communication in accordance with aspects of the technology.

FIG. 3 illustrates an arrangement 300 providing satellite communication with UEs according to the above disclosure. In this arrangement, GWS or GW 100 includes a computer or other processing device 302, which may have one or more Intel® i7 cores or other processors. The processing device couples to a universal software radio peripheral (USRP) 304. The USRP 304 is operatively coupled to the BBUs 112. Information to be communicated to the UEs 40 is upconverted to, e.g., one or more Q/V frequency bands at block 306. Then a central processor for beamforming (CPBF) 308 is configured to generate beamforming information, which is passed to the satellite(s) 20. The satellite(s) 20 perform downlink and/or uplink communication with the UE(s) 40 as described above.

In one embodiment, the operations described above are implemented at the base station processing device (eNodeB) 112, including for example the operation of the CPRI. In other embodiments, the operations are implemented at the control satellite 110 by the control satellite processing device 111.

Accordingly, the satellite 20 communicates with processing devices on Earth, such as for example a user device (e.g., user equipment such as a cell phone, tablet, computer) and/or a ground station. The present disclosure also includes the method of utilizing the satellite 20 to communicate with processing devices on Earth (i.e., transmit and/or receive signals to and/or from). The present disclosure also includes the method of processing devices on Earth communicating with the satellite 20 (i.e., transmit and/or receive signals to and/or from). In addition, while the satellite 20 is used in Low Earth Orbit (LEO) in the examples disclosed, it can be utilized in other orbits or for other applications. Still further, while the system has been described as for an array of antenna assemblies, the system can be utilized for other applications, such as for example data centers, telescopes, reflectors, and other structures, both implemented in space or terrestrially. The satellite 20 and/or a ground station (such as an eNodeB) 100 can include a processing device to perform various functions and operations in accordance with the present disclosure. The processing device can be, for instance, a computing device, processor, application specific integrated circuits (ASIC), or controller. The processing device can be provided with one or more of a wide variety of components or subsystems including, for example, wired or wireless communication links, and/or storage device(s) such as analog or digital memory or a database. All or parts of the system, processes, and/or data utilized in the present disclosure can be stored on or read from the storage device. The processing device can execute software that can be stored on the storage device. Unless indicated otherwise, the process is preferably implemented in automatically by the processor substantially in real time without delay.

One advantage of the present system 5 is that the user equipment 40 need not be modified. Accordingly, the system 5 can be utilized with standard user equipment, as all the operation is controlled by the eNodeB 112.

In describing the illustrative, non-limiting embodiments of the disclosure illustrated in the drawings, specific terminology will be resorted to for the sake of clarity. However, the disclosure is not intended to be limited to the specific terms so selected, and it is to be understood that each specific term includes all technical equivalents that operate in similar manner to accomplish a similar purpose. Several embodiments of the disclosure are described for illustrative purposes, it being understood that the disclosure may be embodied in other forms not specifically shown in the drawings. Numerous applications will readily occur to those skilled in the art. Therefore, it is not desired to limit the disclosure to the specific examples disclosed or the exact construction and operation shown and described. Rather, all suitable modifications and equivalents may be resorted to, falling within the scope of the disclosure.

The invention claimed is:

1. A satellite communication system comprising:
   a base station configured to communicate with standard compliant user equipment (UE) via a satellite having a field of view, the base station comprising a plurality of base band units and a base station memory configured to store control information, downlink signal information and uplink signal information associated with a cell in the field of view; and
   a processing device configured to cause the satellite to generate a satellite beam in accordance with the control information, downlink signal information and uplink signal information stored in the base station memory.

2. The satellite communication system of claim 1, wherein the UE comprises a wireless device.

3. The satellite communication system of claim 1, wherein the UE comprises a cellular phone.

4. The satellite communication system of claim 1, wherein the satellite is arranged to communicate directly with the UE.

5. The satellite communication system of claim 1, wherein the base station memory includes a control information buffer to store the control information, a downlink signal buffer to store the downlink signal information, and an uplink signal buffer to store the uplink signal information.

6. The satellite communication system of claim 1, wherein the downlink signal information and the uplink signal information each include in-phase and quadrature component information for respective downlink or uplink communication channels.

7. The satellite communication system of claim 1, wherein the control information includes one or more of cell identifiers, a communication type, a packing order, a phase array format, beam handover (BHO) cell identifiers, or BHO rescheduling information.

8. A satellite communication method, comprising:
   generating, by a gateway controller module, control information and uplink signal information associated with a cell in a field of view of a satellite configured to communicate with standard compliant user equipment (UE);
   storing, by a common public radio interface (CPRI), the control information in a control information buffer;
   storing, by the CPRI, the uplink signal information in an uplink signal buffer;
   associating, by one or more processors, the control information and uplink signal information with one or more baseband units of a baseband unit array, wherein the control information is used by the gateway controller module to control each of the one or more baseband units;
   obtaining, by the CPRI, downlink signal information from the one or more baseband units;
   storing, by the CPRI, the downlink signal information in a downlink signal buffer; and
   causing the satellite to generate a satellite beam in accordance with the stored control information, downlink signal information and uplink signal information.

9. The method of claim 8, wherein the downlink signal information and the uplink signal information each include in-phase and quadrature component information for respective downlink or uplink communication channels.

10. The method of claim 8, wherein the control information includes one or more of cell identifiers, a communication type, a packing order, a phase array format, beam handover (BHO) cell identifiers, or BHO rescheduling information.

\* \* \* \* \*